May 22, 1951 K. A. LUNDKVIST 2,554,201

KEY-SENDING AUTOMATIC TELEPHONE SIGNALING SYSTEM

Filed June 5, 1947 2 Sheets-Sheet 1

Inventor
K. A. Lundkvist
By Glascock Downing & Seebold
Attys

May 22, 1951 K. A. LUNDKVIST 2,554,201

KEY-SENDING AUTOMATIC TELEPHONE SIGNALING SYSTEM

Filed June 5, 1947 2 Sheets-Sheet 2

Inventor
K. A. Lundkvist
By Glascock Downing & Seebold
Attys

Patented May 22, 1951

2,554,201

UNITED STATES PATENT OFFICE 2,554,201

KEY-SENDING AUTOMATIC TELEPHONE SIGNALING SYSTEM

Karl Axel Lundkvist, Stockholm, Sweden, assignor to Telefonaktiebolaget L M Ericsson, Stockholm, Sweden, a company of Sweden Application June 5, 1947, Serial No. 752,648
In Sweden June 19, 1946

3 Claims. (Cl. 179—16)

The present invention relates to automatic telephone systems wherein the normal impulse senders or dials are replaced by key senders at the subscriber's telephone instruments, and wherein signals actuating a receiving equipment in a central office are effected by connecting a number of sources of alternating current (all with different frequencies) to a calling subscriber's line at the central office, and by connecting with the help of the subscriber's key-set one or more circuits containing each a condenser and an inductance coil, in resonance with one of said frequencies, to the line at the subscriber's station. In a signal receiving device at the central office a relay for each of the frequencies indicates signals corresponding to the keys actuated in the key-set.

A feature of the invention is the use of a signal from the subscriber's station during the operation of a key in the key-set and which brings a relay at the central office in condition to connect said sources of alternating current and said signal receiving device simultaneously to the line. For this signal the normal feeding circuit for the subscriber's microphone is used, and by breaking this circuit and disconnecting the subscriber's receiver and microphone from the line, the feeding relay at the central exchange is deenergized and connects the sources of alternating current and the receiving device to the said line. By this means it is achieved that the impedance of the resonance circuits is the only impedance at the subscriber's station characterizing a signal from the key-set, and the alternating currents through the receiving devices never pass through the subscriber's instrument.

Figure 1:
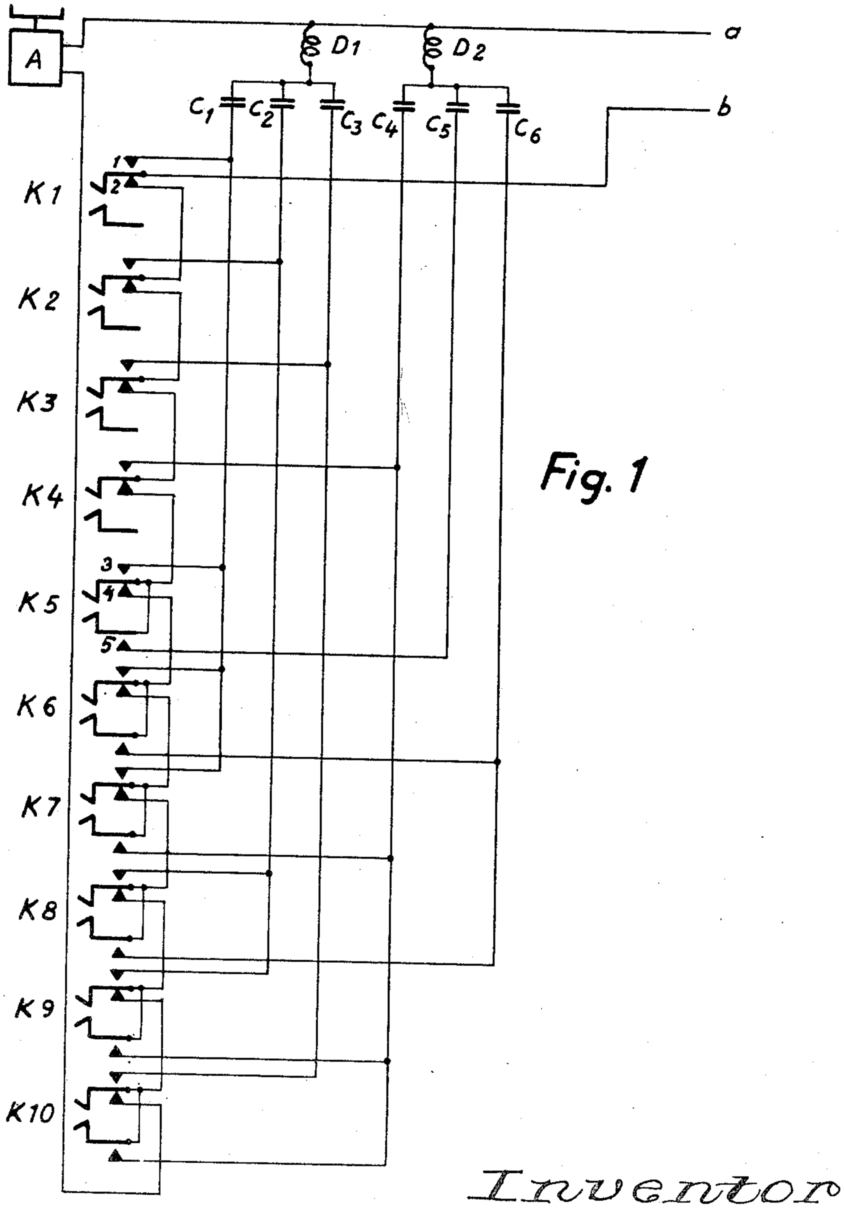

The invention will be described more in detail with reference to the accompanying drawings, in which Fig. 1 shows a key sender consisting of a key-set, condensers and inductance coils at a subscriber's station.

Figure 2:
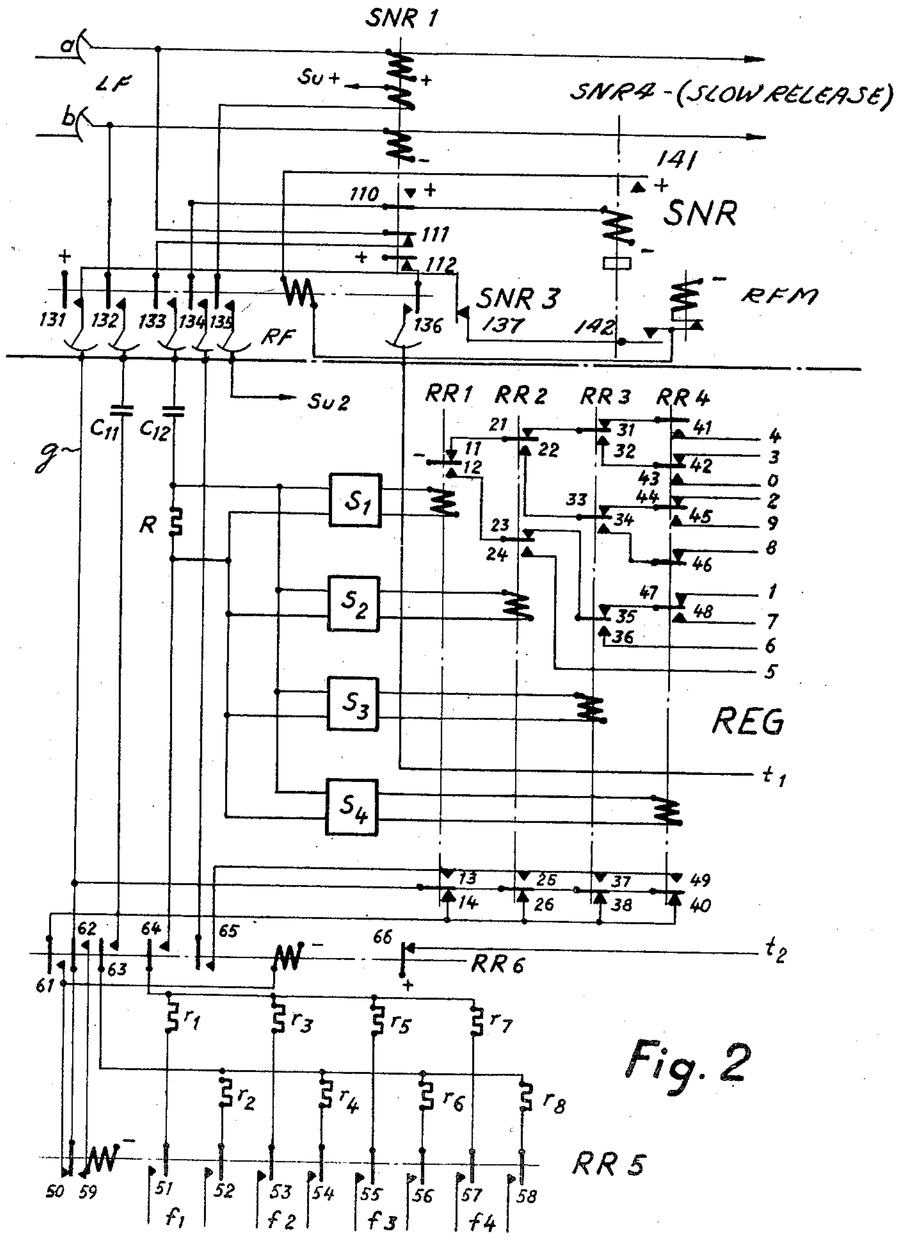

Fig. 2 shows a part of a link circuit and a signal receiving device at the central office.

In initiating a call the subscriber at station A lifts the handset from its support, the line is closed and a communication between the subscriber's line *a*—*b* and a register REG is in a well-known manner automatically arranged over a line finder LF, a link circuit SNR and a register finder RF. During this operation the relays SNR1 and SNR3 are energized. The arrangement and operation of the register finder and relay SNR3 are as disclosed in U. S. Patent 1,674,134 to Schwartz. The feeding relay SNR1 attracts its armature in series with the line circuit. The contacts 110—112 are actuated. Contact 110 connects the positive pole of the exchange battery to the slow releasing relay SNR4 for holding of the connection. The contacts 141 and 142 are closed. As well known in the art, short interruptions in the holding circuit do not cause release of the communication, but the release takes place only upon relatively permanent disconnection of positive battery from the relay SNR4. The contact 142 closes a circuit over contact 137 from positive battery on conductor *g* if the register REG on which the finder RF is standing is busy, and hence energizes the driving magnet RFM of register finder RF, which steps around until no ground (+) is found on the conductor *g* of some register. At this time, test relay SNR3 is energized in series with magnet RFM, which is effectively deenergized due to the series resistance of the winding of relay SNR3. By reason of the relay SNR3 attracting its armature the contacts 131—137 are actuated. Ground (+) is connected to conductor *g* over the contact 131 marking the selected register as busy. A special winding on relay SNR1 is connected over contact 135 to a buzzer signal generator *Su*+, *Su*2, by means of which the calling subscriber hears the buzzer tone and proceeds to actuate the key sender. Contact 131 closes the following circuit: positive battery, contacts 131 and 50, winding on relay RR6 to negative battery. Relay RR6 attracts its armature. Contacts 61—66 are actuated. Relay RR5 receives current over contact 62, attracts its armature and is held over contact 59 when contacts 50—59 are operated.

The key sender in Fig. 1 comprises 10 buttons K1—K10, one for each digit. The *b*-wire of the subscriber's line passes a break contact in each of the pushbuttons K1—K10, for instance contact 2 in K1 and 4 in K5. The key sender can obviously be constructed so that all the pushbuttons actuate the same break contact, for instance by placing all the pushbuttons in a row and actuating a bar running along the row, a saving thus being achieved, and an unnecessarily great number of series-connected contacts being avoided. As soon as any one of the pushbuttons K1—K10 is actuated, the circuit over the subscriber's line is broken and relay SNR1 releases its armature. Contact 111 closes a circuit for four sources of alternating current, e. g. tone generators having the frequencies *f*1 to *f*4. The tones are connected to the pairs of contacts 51—52, 53—54, 55—56 and 57—58, and connected over resistances *r*1—*r*8 to the subscriber's line *a*—*b* over contacts 63—64, condensers C11—C12, resistance R, contacts 132—133 and contact 111. One only (or at the most two) of the tones are allowed to pass the subscriber's key-sender through resonance circuits consisting of a reactance coil D1 or D2 and a condenser C1—C6. If the pushbutton K1 is actuated the frequency $f1$ will be allowed to pass over contact 1, condenser C1 and coil D1, whilst all the other frequencies are suppressed. If the pushbutton K5 is actuated, the frequencies $f1$ and $f2$ will be allowed to pass, whilst $f3$ and $f4$ are suppressed. The frequency $f1$ passes contact 3, condenser C1 and coil D1, whilst frequency $f2$ passes contact 5, condenser C5 and coil D2. The frequencies $f1$ to $f4$ correspond to the digits 1—4, and the frequency combinations $f1+f2$, $f1+f3$, $f1+f4$, $f2+f3$, $f2+f2$ and $f3+f4$ correspond to the figures 5—0.

All the tones which are put on the subscriber's line from the register REG pass through the resistance R in Fig. 2. The voltage drop across said resistance is applied to the signal receivers S1—S4, each of which comprises a valve and a resonance circuit for one of the frequencies $f1$—$f4$, as well as a relay RR1—RR4, these relays constituting indicating devices for the respective frequencies. The signal receiver S1 is tuned to the frequency $f1$, the signal receiver S2 to the frequency $f2$ and so on. The valves in the signal receivers have a certain bias, which is adjusted so that the alternating currents passing over the line capacity of the subscriber's line do not actuate the signal receivers. When one of the frequencies $f1$—$f4$ is allowed to pass through a resonance circuit in the subscriber's key-sender, the voltage drop across resistance R for said frequency overcomes the bias for the corresponding valve, and the relay pertaining to said valve attracts its armature. If only relay RR1 is actuated, the digit 1 is marked over contacts 12, 23, 35 and 47. If both relays RR1 and RR2 are actuated, the digit 5 is marked over the contacts 12 and 24, and so on according to Fig. 2. The marking wires 1—0 in Fig. 2 are supposed to set a registering device. As soon as one of the relays RR1—RR4 is actuated, one of the contacts 13, 25, 37 or 49 is closed, positive battery thus being connected to wire $c$ over contacts 131, 65 and 134 for holding the connection. If the subscriber replaces the handset, the circuit over the subscriber's line is broken, and relay SNR1 releases its armature without any of the relays RR1—RR4 being actuated, since none of the pushbuttons K1—K10 has been actuated. Positive battery is thus permanently disconnected from wire $c$ and the connection is released.

In order to make it possible to connect even long subscriber's lines having a great line capacity to the telephone exchange, the register REG is arranged also so as to register dial impulses. At the first interruption in the impulse contact of a dial, relay SNR1 releases its armature. The tones are connected and, due partly to the great line capacity, and partly to a spark-extinguishing condenser across the impulse contacts of the dial, all four frequencies are allowed to pass and all the relays RR1—RR4 are actuated. All the contacts 14, 26, 38 and 40 break simultaneously. Relay RR6, which according to the description above has attracted its armature, is arranged to be self held over contact 61 in series with contacts 14, 26, 38 or 40 and 131. When all the relays RR1—RR4 are actuated, the circuit is broken for relay RR6, which then releases its armature and disconnects the tone generators by opening contacts 63 and 64. Contact 66 is closed. A circuit is completed for each emitted impulse over contacts 112 and 136 and wire $t1$, which leads to a relay device of known kind for registration of the impulses. Said relay device is however dependent on positive battery from contact 66 over wire $t2$, due to which no registration will be effected without relay RR6 releasing its armature during the first impulse in an impulse train from the dial.

The invention is obviously not limited to the embodiment described above. Instead of four frequencies, five to ten can be used, and instead of valves for each signal receiver, a common amplifying valve can be arranged for all the frequencies.

I claim:

1. In an automatic telephone system, a subscriber's station having a receiver and a transmitter, a central office, a line interconnecting said station and said central office, a number of sources of alternating current all of different frequencies and a signal receiving device at said central office, a set of keys and a number of condensers and inductance coils at said station, said keys including break contacts, a direct current circuit closed over said line and over at least one break contact in said set of keys and including at said central office a source of direct current and a relay, means at said central office responsive to initiation of a call for preparing said sources of alternating current and said signal receiving device for connection to said line, a contact on said relay operative for connecting said sources of alternating current and said signal receiving device, during the operation of one of said keys, simultaneously to the line, at least one key in said set of keys being operable for disconnecting said receiver and transmitter from the line and connecting at least one resonant circuit containing one of said condensers and one of said inductance coils in resonance with one of said frequencies to the line and for breaking said break contact to cause said relay to connect said sources of alternating current simultaneously to the line, and indicating means in said signal receiving device for each of said frequencies operable to indicate that the line is closed over a circuit in resonance for such frequency.

2. In an automatic telephone system as claimed in claim 1, a holding circuit, a make contact on said relay for closing said holding circuit, said make contact being closed when said relay is energized and opened when said relay is deenergized, and another make contact controlled by said indicating means for closing said holding circuit.

3. In an automatic telephone system as claimed in claim 1, said relay being changed to repeat impulses arising from interruptions of said direct current circuit, without closing the line through a resonance circuit, to a conductor for transmitting the impulses within the telephone system.

KARL AXEL LUNDKVIST.

REFERENCES CITED

The following references are of record in the file of this patent:

UNITED STATES PATENTS

| Number | Name | Date |
|---|---|---|
| 1,337,715 | McQuarrie | Apr. 20, 1920 |
| 1,541,367 | McQuarrie | June 9, 1925 |
| 2,164,335 | Mathes | July 4, 1939 |
| 2,201,296 | Lundstrom | May 21, 1940 |
| 2,228,113 | Hersey | Jan. 7, 1941 |
| 2,244,500 | Nyquist | June 3, 1941 |
| 2,306,067 | Lewis | Dec. 22, 1942 |
| 2,308,637 | Babcock et al. | Jan. 19, 1943 |